(12) United States Patent
Adcock (10) Patent No.: US 7,188,060 B1
(45) Date of Patent: Mar. 6, 2007

(54) EMULATION OF A HIGH-SPEED, HIGH-STABILITY CLOCK

(75) Inventor: James W. Adcock, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 843 days.

(21) Appl. No.: 10/113,121

(22) Filed: Mar. 29, 2002

(51) Int. Cl.
G06F 17/50 (2006.01)
G06F 1/14 (2006.01)
G06F 1/12 (2006.01)

(52) U.S. Cl. .................. 703/14; 713/400; 713/502; 713/503; 717/138

(58) Field of Classification Search ............... 703/14, 703/19, 23, 25; 713/375, 400, 500, 503, 713/502; 717/138
See application file for complete search history.

(56) References Cited

U.S. PATENT DOCUMENTS

| | | | |
|---|---|---|---|
| 5,546,568 A * | 8/1996 | Bland et al. | 713/501 |
| 5,838,948 A * | 11/1998 | Bunza | 703/27 |
| 6,006,319 A * | 12/1999 | Takahashi et al. | 712/34 |
| 6,182,025 B1 * | 1/2001 | Packer | 703/24 |
| 6,385,637 B1 * | 5/2002 | Peters et al. | 718/107 |
| 6,571,106 B1 * | 5/2003 | Li | 709/208 |
| 6,629,256 B1 * | 9/2003 | Ilan et al. | 713/501 |
| 6,775,789 B2 * | 8/2004 | Elko et al. | 713/500 |
| 6,996,504 B2 * | 2/2006 | Novotny et al. | 703/1 |
| 2001/0000426 A1 * | 4/2001 | Sung et al. | 331/25 |
| 2002/0194393 A1 * | 12/2002 | Hrischuk et al. | 709/318 |
| 2003/0014678 A1 * | 1/2003 | Ozcetin et al. | 713/400 |

OTHER PUBLICATIONS

David L. Mills, The network Computer as Precision Timekeeper, Dec. 1996, Proc. Precision Time and Time Interval (PTTI) Application and Planning Meeting, pp. 1-7.*

* cited by examiner

Primary Examiner—Kamini Shah
Assistant Examiner—Kibrom Gebresilassie
(74) Attorney, Agent, or Firm—Charles A. Johnson; Mark T. Starr; Crawford Maunu PLLC (57) ABSTRACT

A method and apparatus for emulating a high-precision, high-accuracy clock. In one embodiment, two clocks are used in the emulation. The first clock has precision greater than precision of the second clock and accuracy less than accuracy of the second clock. A checkpoint time relative to elapsed cycles of the second clock and a checkpoint cycle count of cycles of the first clock are periodically stored relative to a checkpoint period that lasts for a selected number of cycles of the second clock. A reference cycle rate of the first clock is calculated relative to the cycle rate of the second clock. The current time is determined as a function of the checkpoint time, a number of cycles of the first clock elapsed since storing the most recent checkpoint cycle count, and the reference cycle rate of the first clock.

10 Claims, 6 Drawing Sheets

EMULATION OF A HIGH-SPEED, HIGH-STABILITY CLOCK

FIELD OF THE INVENTION

The present invention generally relates to clocks in computing arrangements, and more particularly to emulating the function of a high-speed, high-stability clock in a computing arrangement.

BACKGROUND OF THE INVENTION

Re-deploying specialized application software from proprietary processors to commodity processors brings many challenges. For example, some applications require a high-stability, high-precision clock for tracking the passage of time. However, some commodity processors lack the high-stability, high-precision clock circuitry to satisfy application requirements. This leaves the options of selecting an alternative processor, which may be expensive, or designing a custom clock circuit, which is expensive and negates certain advantages of designs with commodity processors.

High stability refers to some accepted or required level of accuracy relative to actual time. An example acceptable level of accuracy for a high-stability clock might be $\frac{1}{10,000}$ or approximately 8.6 seconds/24 hours. The accuracy that constitutes high-stability will vary from application to application. High precision refers to an accepted or required level of granularity with which time must be measured. For example, an application may require time to be measurable in micro-seconds.

Some processors include a high-speed clock that is generally used to clock the processor logic. The accuracy of the high-speed clock is not critical because it is generally used for synchronizing the logic and not for keeping time. Example high-speed clocks are the CPU clocks of certain processors from Intel, which are phase locked to a bus clock. The CPU clock operates at some multiple of one-half the bus clock. Even though the CPU clock is fast and very precise, its accuracy cannot be relied upon for time-critical applications.

The example Intel processors also include a real time clock circuitry in addition to the CPU clock. The real time clock is based on the industry standard DS1287 PC clock having a 32,768 cycles/second reference oscillator with an accuracy of 20 parts per million. The Windows® NT operating system from Microsoft when running in the example Intel processors provides time functions having millisecond precision. Even though millisecond precision may be acceptable from some applications, other applications require greater precision.

A method and apparatus that addresses the aforementioned problems, as well as other related problems, are therefore desirable.

SUMMARY OF THE INVENTION

In various embodiments, the invention provides a method and apparatus for emulating a high-precision, high-accuracy clock. In one embodiment, two clocks are used in the emulation. The first clock has precision greater than precision of the second clock and accuracy less than accuracy of the second clock. A checkpoint time relative to elapsed cycles of the second clock and a checkpoint cycle count of cycles of the first clock are periodically stored relative to a checkpoint period that lasts for a selected number of cycles of the second clock. A reference cycle rate of the first clock is calculated relative to the cycle rate of the second clock. The current time is determined as a function of the checkpoint time, a number of cycles of the first clock elapsed since storing the most recent checkpoint cycle count, and the reference cycle rate of the first clock.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention emulates a high-precision, high-accuracy clock. In one embodiment, a fast high-speed clock provides high-precision, and a slower clock provides high accuracy. The slower high-accuracy clock is used to periodically generate a checkpoint time and to determine the cycle rate of the first clock. The current time is determined using the checkpoint time, the cycle rate of the first clock, and the number of cycles of the first clock occurring since the checkpoint time. In another embodiment, the cycle rate of the first clock is periodically determined.

Figure 1:
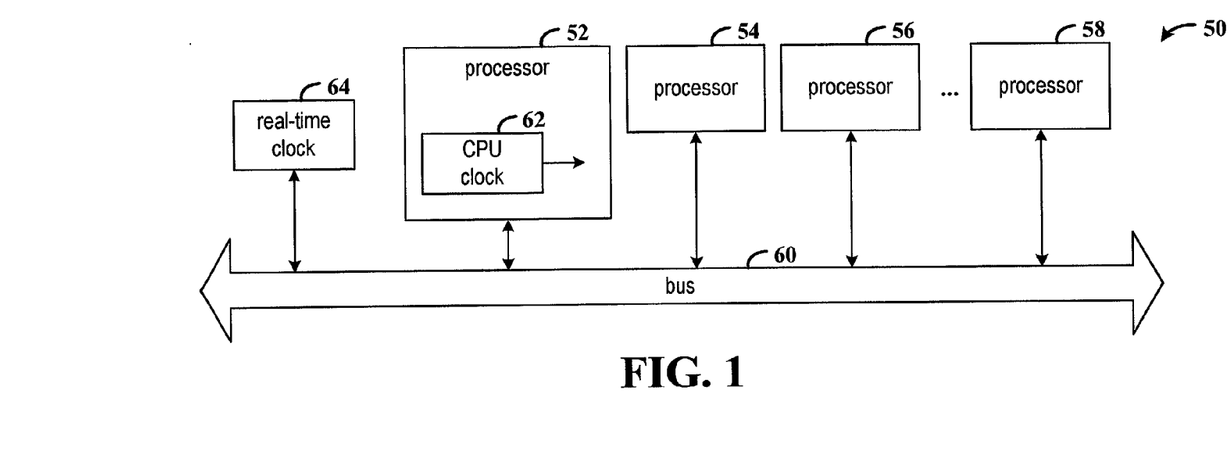
FIG. 1 illustrates an example processor arrangement including a plurality of processors.

FIG. 1 illustrates an example processor arrangement 50 including a plurality of processors. Processors 52, 54, 56, and 58 are inter-coupled by bus 60. In one embodiment, processor arrangement 50 is part of a multi-processor data processing system that includes additional components such as memory and input/output circuitry.

Each of the processors includes a respective clock circuit. CPU clock 62 is a high-speed clock that is used to clock various elements of the processor circuit. Accuracy and stability of the CPU clock is relatively less critical because the CPU clock is not used for timekeeping functions that require high accuracy. In processor architectures such as those made by Intel, the rate of the CPU clock is phase locked to the bus clock (not shown) and is some multiple of one-half the bus clock rate. For example, if the bus clock rate is 100 MHz, then the CPU clock rate is a multiple of 50 MHz.

Real-time clock 64 provides high-accuracy time keeping for the processors 52, 54, 56, and 58 that are coupled to bus 60. In an example implementation, the real-time clock is based on the industry standard DS1287 PC clock, which is based on a 32,768 cycles/second reference oscillator. The accuracy and long term stability of the reference oscillator is 20 parts/million. In one Intel architecture, the real-time clock provides a periodic interrupt to the processor that is configurable in the range of 0.122070 ms to 500.0 ms. The examples in the remainder of this description generally assume a 15.625 ms periodic interrupt, which effectively provides a 64 Hz clock. In order to achieve a precision greater than that achievable with the 64 Hz clock and stability greater than that achievable with the CPU clock, the real-time clock is used to checkpoint and calibrate the CPU clock. The example embodiment described below provides microsecond accuracy.

Figure 2:
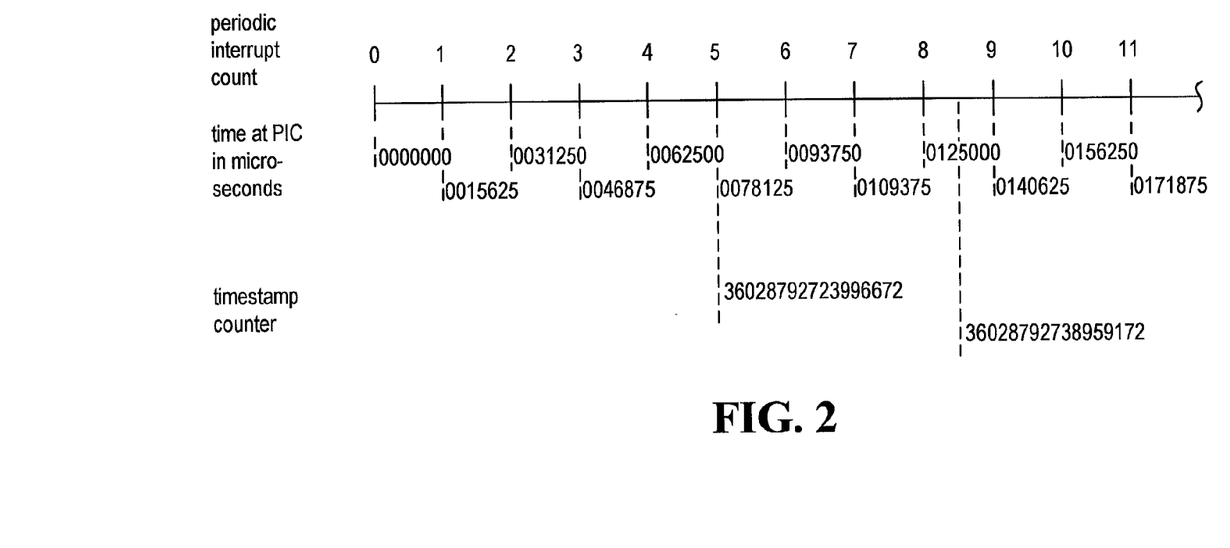
FIG. 2 illustrates a timeline marked by a count of periodic interrupts, the passage of time at each periodic interrupt, and numbers cycles of the CPU clock.

FIG. 2 illustrates a timeline marked by a count of periodic interrupts, the passage of time at each periodic interrupt, and numbers cycles of the CPU clock. The supporting operating system, for example Windows NT, maintains a periodic interrupt count (PIC) of interrupts that have occurred since the system was started. The PIC is marked with hashes on the timeline.

The values left-aligned below the hashes are the elapsed times in microseconds (assuming an interrupt period of 15.625 ms) from the time that the system started. For example, after one PIC, the elapsed time is 15,625 microseconds. Note that the examples and embodiments described hereafter also assume microsecond precision. Those skilled in the art will appreciate, however, that the present invention could be applied to a different level of precision, depending on implementation requirements.

The cycles of the CPU clock are tracked by a timestamp counter (TSC) in processor architectures such as those from Intel. The high-speed CPU clock provides a greater precision than the real-time clock.

In one embodiment, the present invention checkpoints the PIC and TSC. The current time is the sum of the checkpoint PIC in microseconds plus the time elapsed since the checkpoint as measured by the TSC. The time elapsed since the checkpoint is obtained by subtracting the checkpoint TSC from the current TSC, converting the difference to microseconds using the cycle rate of the CPU clock. For example, if a checkpoint was taken at PIC=5, the checkpoint PIC time is 78,125 microseconds, and the checkpoint TSC is 36,028,792,723,996,672 cycles. If between PICs 8 and 9, the current time is requested, the TSC is read from the system. The current TSC is 36,028,792,738,959,172. The current time is 78,125 microseconds+((36,028,792,738,959,172 cycles−36,028,792,723,996,672 cycles)/cycles/microsecond).

Figure 3:
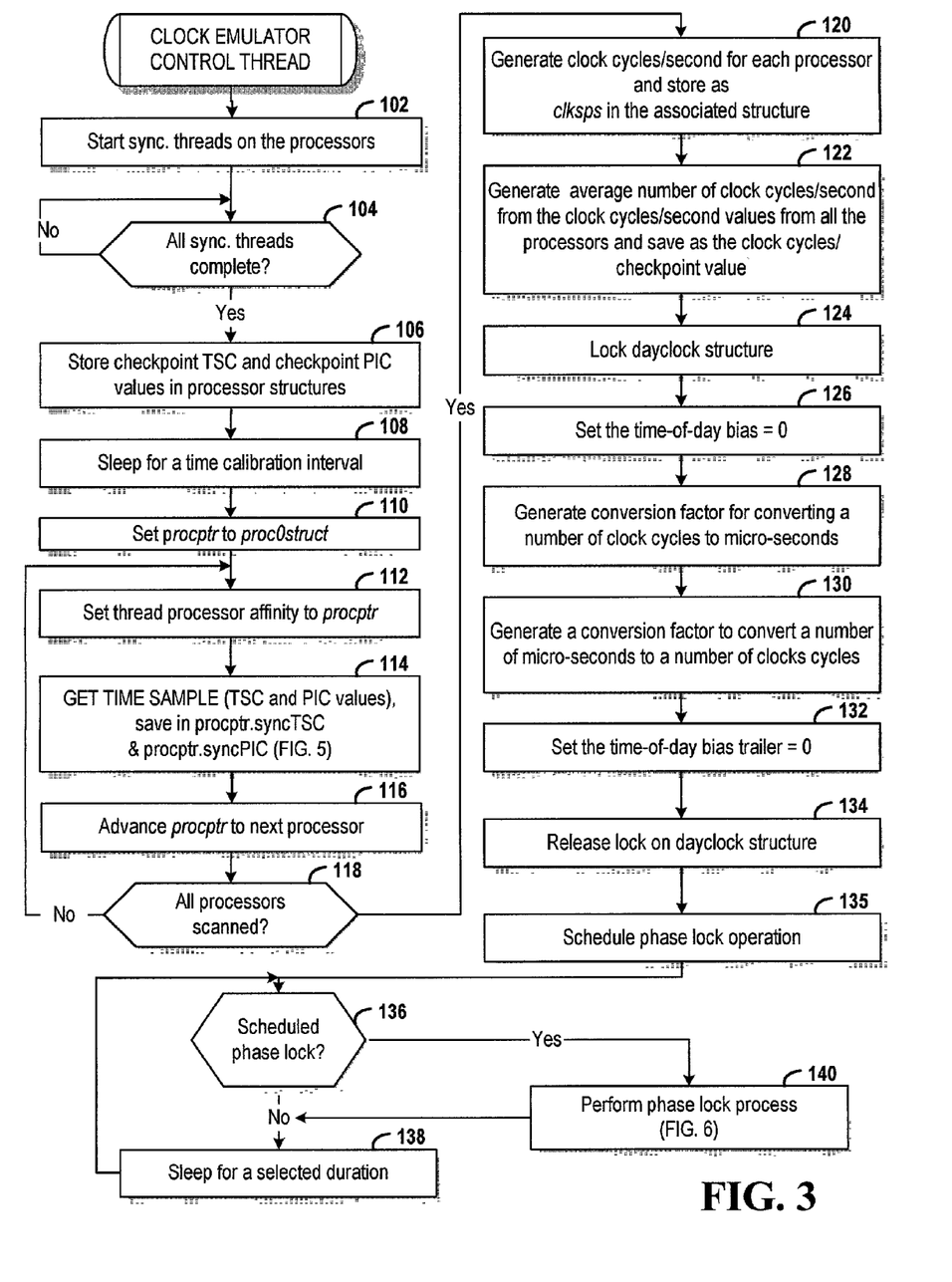
FIG. 3 is a flowchart of an example process implemented by a clock emulator control thread.

FIG. 3 is a flowchart of an example process implemented by a clock emulator control thread. The clock emulator control thread provides the overall control of the clock emulation process. In a first phase of the process, respective synchronization threads are started on the processors of the system (step 102). The synchronization threads establish initial values for checkpoint TSC and checkpoint PIC values.

Figure 4:
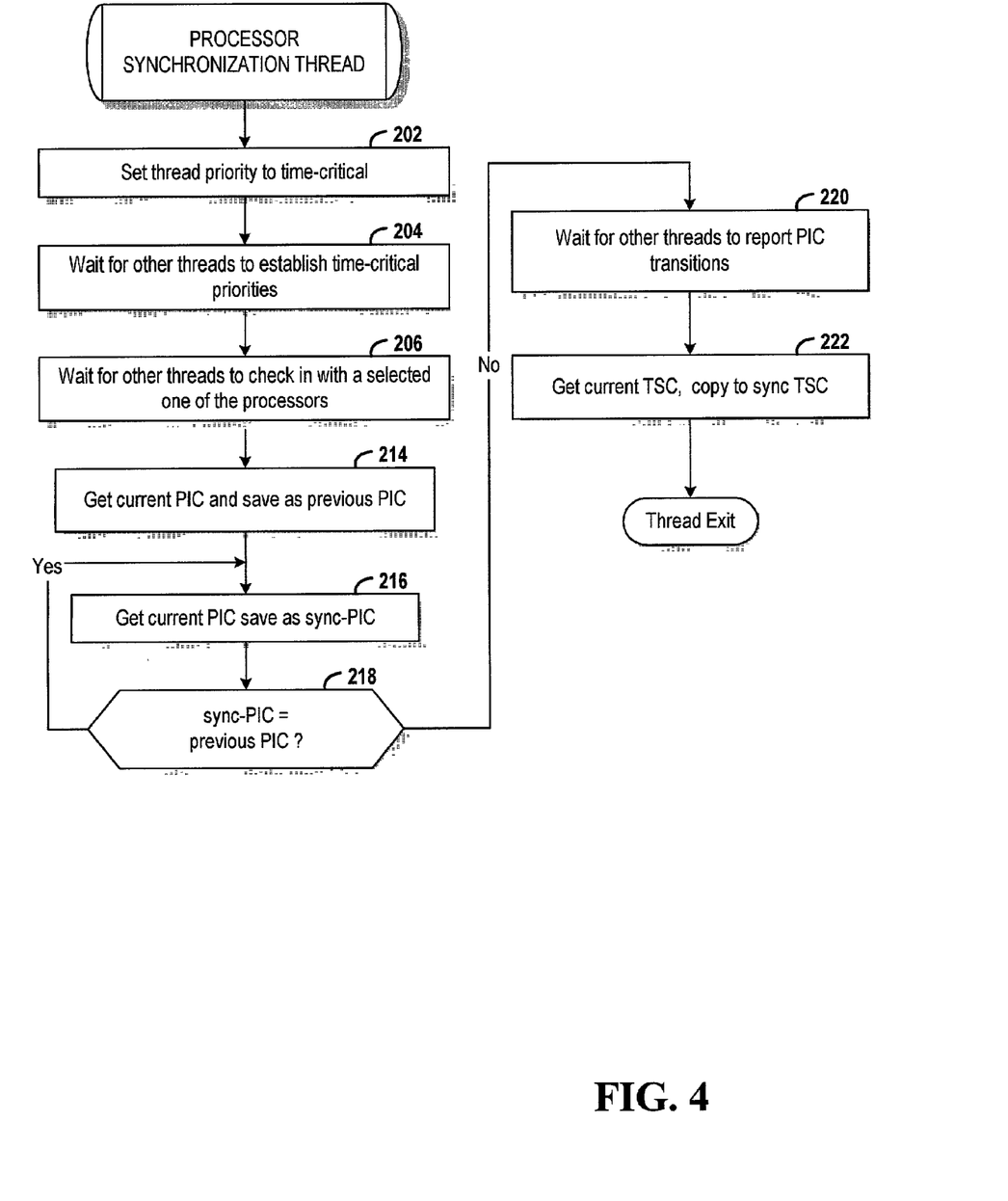
FIG. 4 is a flowchart of an example synchronization process performed by a thread on each of the processors.

FIG. 4 further describes the process performed by a synchronization thread. When all synchronization threads are complete (step 104) the process continues by storing checkpoint TSC values in data structures associated with the processors (step 106).

The control thread process continues by sleeping for an interval that is selected for calibration (step 108). The calibration interval is a portion of the checkpoint interval required to establish an initial clock cycles/second value in a minimal amount of time. The next phase of the process obtains sample TSC and PIC values for each of the processors. The pointer procptr is set to reference the structure procostruct associated with processor O (step 110). The thread processor affinity is then set to reference the procptr. The processor affinity of a thread indicates on which processor in a multiprocessor system a thread is to run. Because a TSC is maintained for each processor, the thread can calculate for each processor the number of clock cycles from the beginning of the time calibration interval until the time sample of the PIC transition at the end of the time calibration interval. Sample TSC and PIC values are obtained from the processor referenced by procptr and then saved in the processor structure as the values syncTSC and syncPIC (step 114).

Figure 5:
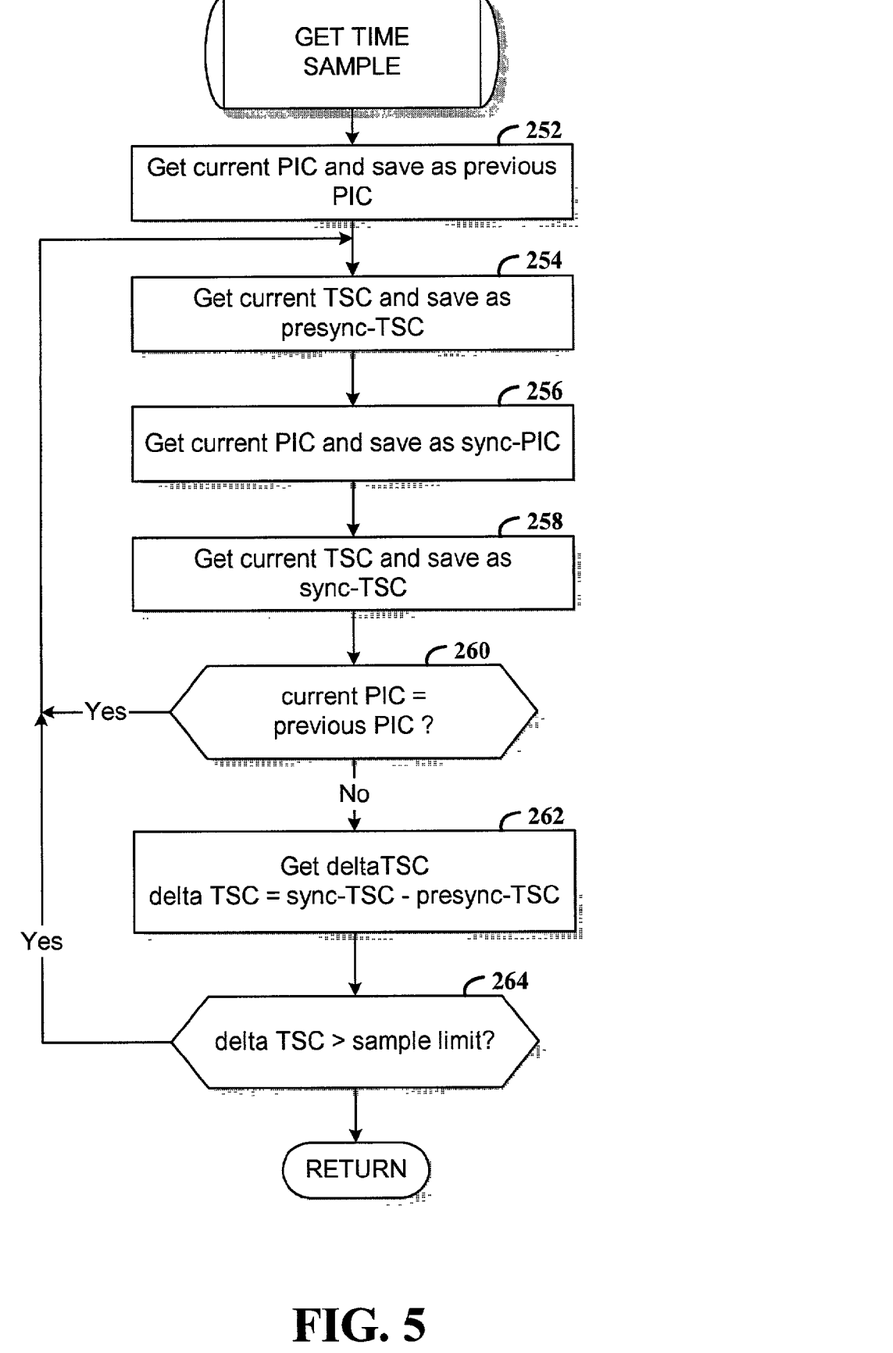
FIG. 5 is a flowchart of an example process for obtaining a time sample in accordance with one embodiment of the invention.

An example process for obtaining the TSC and PIC values is shown in FIG. 5. The procptr is then advanced to the next processor (step 116), and control is returned to step 112 until TSC and PIC values have been obtained from all the processors (step 118).

The next phase of the control thread process generates initial values that are used to determine the current time. For each processor, a number of clock cycles/second is generated using the syncTSC, checkpoint TSC, syncPIC, and checkpoint PIC values (step 120) and saved in the processor-associated structure. The values are saved in the data structure associated with the processor. The number of clock cycles/second=((syncTSC−checkpointTSC)*PICs/second)/(syncPIC−checkpointPIC). The number of PICs/second is obtained from the operating system. From the numbers of clock cycles/second, an average is computed and saved as the clock cycles/second value (step 122). The expected number of clock cycles/checkpoint is generated from the previous PIC value and PIC value at the checkpoint.

A data structure ("dayclock" structure) that is used to store the various conversion factors and checkpoint values is locked (step 124), and a time-of-day bias value is set to o (step 126). A first conversion factor for converting a number of clock cycles to microseconds is generated using the average number of clock cycles/second, and the conversion factor is stored in the dayclock structure (step 128). A second conversion factor for converting a number of microseconds to a number of clock cycles is generated using the average number of clock cycles/second (step 130).

A time-of-day bias trailer value is set to o (step 132) before the lock on the dayclock structure is released (step 134). A phase lock operation is scheduled to occur after a checkpoint interval following the initial time calibration (step 135).

The control thread then proceeds to loop to check for scheduled phase lock operations (decision step 136). When a phase lock operation is detected, the control thread activates the phase lock process (step 140). Otherwise, the control thread sleeps for a selected duration.

FIG. 4 is a flowchart of an example synchronization process performed by a thread on each of the processors. The thread is assigned a time-critical priority (step 202) so that the process is performed with minimal interruptions. The process waits (step 204) to proceed until the threads on the other processors have also established a time-critical priority. In one embodiment, a control word is shared between the threads to report synchronization activities.

Each thread also waits until the other threads have checked in with a selected one of the processors (step 206). The threads then continue by getting the current PIC value and saving the value as the previous PIC (step 214). The current PIC is then read again and saved as the sync-PIC value (step 216). The thread then repeatedly reads the current PIC and saves the value to sync-PIC until the sync-PIC no longer equals the previous PIC value (decision step 218).

The thread then waits until the other threads report that the current PIC has advanced (step 220). Once all the threads have reported that the PIC has advanced, the current TSC is read and saved as the sync-TSC value (step 222), and the thread then exits.

FIG. 5 is a flowchart of an example process for obtaining a time sample in accordance with one embodiment of the invention. The process generally entails waiting for the PIC to advance before returning a change in the TSC. The current PIC is read and saved as the previous PIC (step 252) to serve as a loop control. The current TSC is read and saved as the presync-TSC value (step 254), and the current PIC is read and saved as the sync-PIC value (step 256). The current TSC is again read and saved as the sync-TSC value (step 258).

If the PIC has not advanced (decision step 260), the steps of reading and saving the current TSC and current PIC are repeated. Otherwise, the process is directed to step 262, where a delta-TSC value is obtained. The delta-TSC is equal to the sync-TSC value minus the presync-TSC value. If the delta-TSC value is greater than a selected sample limit (decision step 264), the process is repeated beginning at step 254. Otherwise, the sync-PIC and sync-TSC values are returned as the sample time values.

Figure 6:
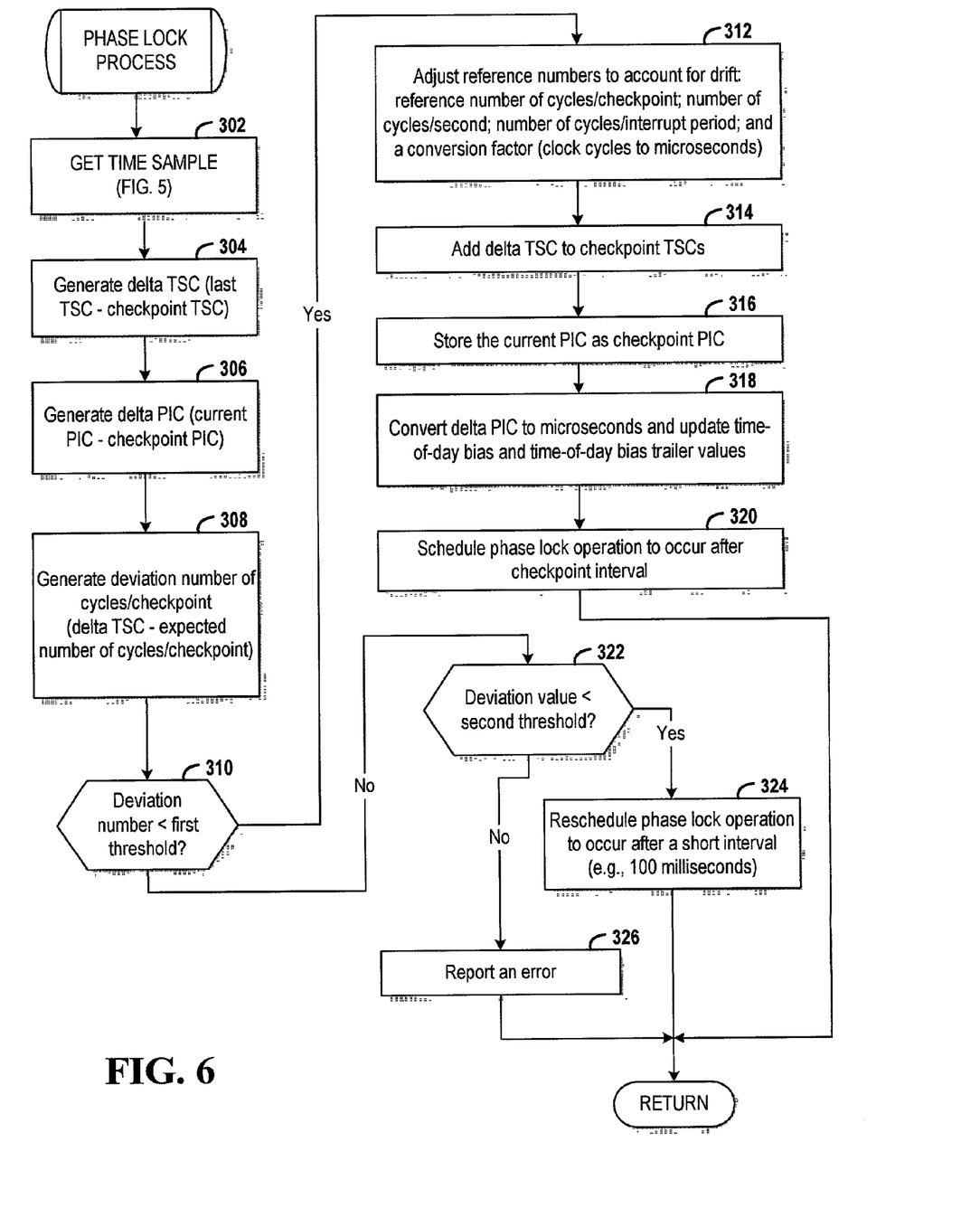
FIG. 6 is a flowchart of the phase lock process.

FIG. 6 is a flowchart of the phase lock process. The phase lock process periodically adjusts the reference values of cycles/second and cycles/checkpoint based on observed counts of the PIC and TSC. When the phase lock process is activated, the get time sample process of FIG. 5 is activated to obtain the current PIC and current TSC values (step 302).

The change in TSC values between checkpoints ("delta TSC") is determined using the last TSC and the checkpoint TSC (step 304), and the change in PIC values between checkpoints ("delta PIC") is determined using the current PIC and checkpoint PIC (step 306). The "deviation number" of cycles/checkpoint is generated as the difference between the delta TSC and the expected number of clock cycles/checkpoint (step 308). The expected number of clock cycles/checkpoint is generated from the delta PIC, the system-provided number of PICs/second, and number of cycles/second.

If the deviation number is less than a first threshold (decision step 310), the process continues by adjusting the reference numbers to account for the observed drift (step 312). The particular threshold value chosen is implementation dependent, and in one embodiment is 0.001526% of the reference number of cycles/checkpoint. In one embodiment, the reference number of cycles/checkpoint is adjusted by adding the deviation number/8 to the expected number of cycles/checkpoint. Other reference numbers that are adjusted include the number of cycles/second, number of cycles/interrupt period, and a conversion factor used to convert clock cycles to microseconds.

The delta TSC value is added to the respective checkpoint TSC values on the processors (step 314). Each processor has an associated checkpoint TSC that is referenced when the processor seeks the current time (FIG. 5). The current PIC is saved as the checkpoint PIC (step 316). Current time-of-day values are updated by converting the delta PIC value to microseconds and adding the delta PIC value to the current time-of-day values (step 318). Another phase lock operation is then scheduled to occur after another checkpoint interval has passed (step 320). In one embodiment, the checkpoint interval is 50 seconds. Different checkpoint intervals may be better suited for different implementations.

If the deviation number of cycles/checkpoint is not greater than the first threshold (decision step 310), but is less than a second threshold (decision step 322), a phase lock operation is scheduled (step 324) to occur after a short interval, for example 100 ms. An example second threshold value is 0.006104% of the reference number of cycles/checkpoint. This condition may occur because of a sample error that is caused by the incrementing of the PIC being delayed by a processor operating with interrupts locked. The checkpoint interval will be increased by rescheduling but not enough to introduce a significant error.

If the deviation value is beyond both the first and second thresholds, an error condition is reported (step 326) before returning control to the main thread.

Those skilled in the art will appreciate that the TSC eventually resets to zero. The processing in the phase lock process that accounts for resetting of the TSC has not been shown in order to not obscure the invention. The necessary adjustments to account for resetting the TSC will be recognized by those skilled in the art.

Figure 7:
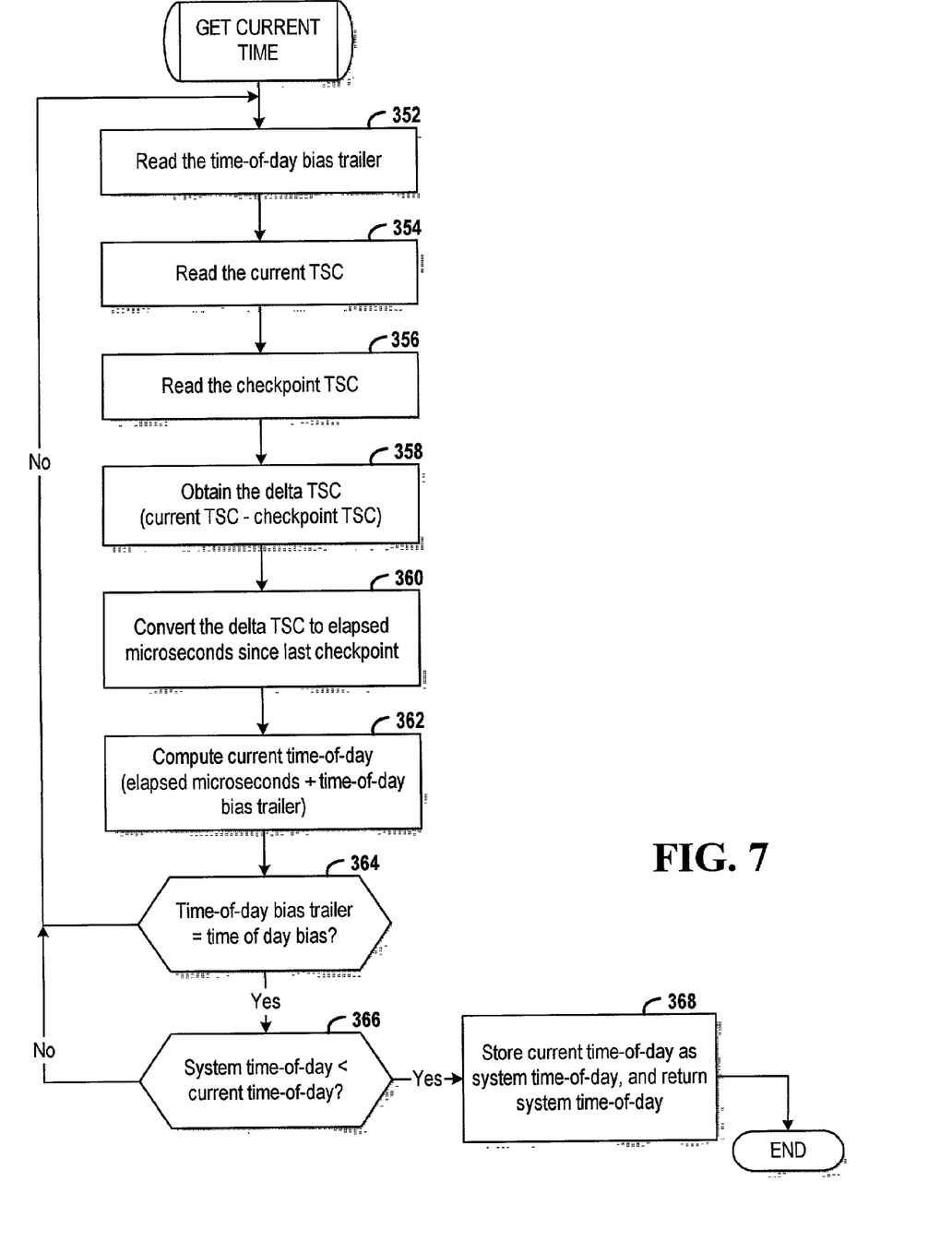
FIG. 7 is a flowchart of an example process for obtaining the current time in accordance with one embodiment of the present invention.

FIG. 7 is a flowchart of an example process for obtaining the current time in accordance with one embodiment of the present invention. To avoid having to lock variables that are updated by the phase lock process and still provide access to the variable to obtain the current time, two variables are used to store the current time-of-day. The variables are the time-of-day bias trailer and the time-of-day bias. When both variables have been updated by the phase lock process, the time-of-day value computed is valid.

The time-of-day bias trailer, the current TSC, and the checkpoint TSC are first read (steps 352, 354, 356). The delta TSC is obtained to determined the number of cycles since the last checkpoint (step 358). Then the delta TSC is converted to microseconds to obtain the number of microseconds that have elapsed since the last checkpoint (step 360), and the current time-of-day is computed by adding the number of elapsed microseconds to the time-of-day bias trailer (step 362).

If the time-of-day bias trailer is not equal to the time-of-day bias (decision step 364), the steps of computing the current time of day are repeated. Otherwise, the current time-of-day is compared to the system-kept time-of-day (decision step 366). If the system time-of-day is less than the current time-of-day, the current time-of-day is stored as the system time-of-day, and the system time-of-day is returned (step 368). If the current time-of-day is less than or equal to the system time-of-day, the process of obtaining the current time-of-day is repeated.

Accordingly, the present invention provides, among other aspects, a method and apparatus for emulating a high-precision, high-accuracy clock. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for emulating a high-precision, high-accuracy clock using a first clock and a second clock, comprising:

periodically storing, relative to a checkpoint period lasting for a selected number of cycles of the second clock, a checkpoint time indicating a number of elapsed cycles of the second clock at the end of the period and a checkpoint cycle count indicating a number of elapsed cycles of the first clock at the end of the period, wherein the first clock operates with a greater rate of oscillation and lesser accuracy than the second clock;

calculating a first-clock-delta value as a difference between a current count of elapsed cycles of the first clock and a most recently stored checkpoint cycle count of the first clock;

converting the first-clock-delta value to units compatible with a most recently stored checkpoint time of the second clock; and;

determining a current time as a sum of the most recently stored checkpoint time and the first-clock-delta value;

periodically calculating, according to the checkpoint period, a reference cycle rate of the first clock relative to the rate of oscillation of the second clock and using the reference cycle rate in converting the first-clock-delta value to units compatible with the most recently stored checkpoint time of the second clock;

finding a current rate of oscillation of the first clock relative to the rate of oscillation of the second clock; and in response to an absolute value of a difference between the current rate of oscillation of the first clock and the reference cycle rate being less than a selected first threshold, changing the reference cycle rate by one-eighth the difference between the current rate of oscillation of the first clock and the reference cycle rate.

2. The method of claim 1, further comprising reporting an error condition if an absolute difference between the current rate of oscillation of the first clock and the reference cycle rate is not less than a selected second threshold.

3. A computer-implemented method for emulating a high-precision, high-accuracy clock using a first clock and a second clock, comprising:

generating an initial value for a reference cycle rate for the first clock;

periodically saving a first checkpoint cycle count that indicates a total of elapsed cycles of the first clock according to a checkpoint period lasting for one or more cycles of the second clock, wherein the first clock operates with a greater rate of oscillation and lesser accuracy than the second clock, and the second clock rate having an assigned constant value;

periodically saving a second checkpoint cycle count, concurrent with saving the first checkpoint cycle count, wherein the second checkpoint cycle count indicates a total of elapsed cycles of the second clock according to the checkpoint period;

periodically generating an observed cycle rate of the first clock according to the first period and using the second checkpoint cycle count, a current cycle count of the second clock, and the constant value of the second clock rate;

adjusting the reference cycle rate as a function of the observed cycle rate;

calculating a first-clock-delta value as a difference between a current count of elapsed cycles of the first clock and a most recently saved first checkpoint cycle count of the first clock;

converting the first-clock-delta value to units compatible with a most recently saved second checkpoint time of the second clock and adjusting the first-clock-delta value as a function of the reference cycle rate; and indicating a current time value as a sum of the most recently saved second checkpoint cycle count and the first-clock-delta value;

determining a current cycle rate from the second checkpoint cycle count, a current cycle count of the second clock, the cycle rate of the second clock, the first checkpoint cycle count, and a current cycle count of the first clock; and in response to an absolute value of a difference between the current cycle rate and the reference cycle rate being less than a selected first threshold, changing the reference cycle rate by one-eighth the difference between the current cycle rate and the reference cycle rate.

4. The method of claim 3, wherein a plurality of homogenous processors are inter-coupled, and each processor has a respective first clock and second clock, further comprising:

generating the observed cycle rate at a selected one of the processors;

updating respective first checkpoint cycle counts on all the processors as a function of the observed cycle rate; and at each processor, indicating a current time value as a function of the respective second checkpoint cycle counts, the reference cycle rate, and a number of cycles of the respective first clock elapsed since the saved second checkpoint cycle count.

5. The method of claim 4, further comprising generating the initial value for the reference cycle rate as a function of observed cycle rates of respective first clocks on the plurality of processors.

6. The method of claim 5, wherein the initial value for the reference cycle rate is an average of observed cycle rates of respective first clocks on the plurality of processors.

7. The method of claim 3, further comprising if the absolute value of the difference between the current cycle rate and the reference cycle rate is not less than a selected first threshold and is less than a second selected threshold, then after waiting for an interval that is less than the checkpoint period, saving a current cycle count of the first clock as the first checkpoint cycle count, saving a current cycle count of the second clock as the second checkpoint cycle count, generating an observed cycle rate of the first clock using the second checkpoint cycle count, a current cycle count of the second clock, and the constant value of the second clock rate.

8. An apparatus for emulating a high-precision, high-accuracy clock using a first clock and a second clock, comprising:

means for periodically storing, relative to a checkpoint period lasting for a selected number of cycles of the second clock, a checkpoint time indicating a number of elapsed cycles of the second clock at the end of the period and a checkpoint cycle count indicating a number of elapsed cycles of the first clock at the end of the period, wherein the first clock operates with a greater rate of oscillation and lesser accuracy than the second clock;

means for calculating a first-clock-delta value as a difference between a current count of elapsed cycles of the first clock and a most recently stored checkpoint cycle count of the first clock;

means for converting the first-clock-delta value to units compatible with a most recently stored checkpoint time of the second clock; and;

means for determining a current time as a sum of the most recently stored checkpoint time and the first-clock-delta value;

means for periodically calculating, according to the checkpoint period, a reference cycle rate of the first clock relative to the rate of oscillation of the second clock and using the reference cycle rate in converting the first-clock-delta value to units compatible with the most recently stored checkpoint time of the second clock;

means for finding a current rate of oscillation of the first clock relative to the rate of oscillation of the second clock; and means, responsive to an absolute value of a difference between the current rate of oscillation of the first clock and the reference cycle rate being less than a selected first threshold, for changing the reference cycle rate by one-eighth the difference between the current rate of oscillation of the first clock and the reference cycle rate.

9. An apparatus for emulating a high-precision, high-accuracy clock using a first clock and a second clock, comprising:

means for generating an initial value for a reference cycle rate for the first clock;

means for periodically saving a first checkpoint cycle count that indicates a total of elapsed cycles of the first clock according to a checkpoint period lasting for one or more cycles of the second clock, wherein the first clock operates with a greater rate of oscillation and lesser accuracy than the second clock, and the second clock rate having an assigned constant value;

means for periodically saving a second checkpoint cycle count, concurrent with saving the first checkpoint cycle count, wherein the second checkpoint cycle count indicates a total of elapsed cycles of the second clock according to the checkpoint period;

means for periodically generating an observed cycle rate of the first clock according to the first period and using the second checkpoint cycle count, a current cycle count of the second clock, and the constant value of the second clock rate;

means, responsive to an absolute value of a difference between the observed cycle rate and the reference cycle rate being less than a selected first threshold, for changing the reference cycle rate by one-eighth the difference between the observed cycle rate and the reference cycle rate;

means for calculating a first-clock-delta value as a difference between a current count of elapsed cycles of the first clock and a most recently stored first checkpoint cycle count of the first clock;

means for converting the first-clock-delta value to units compatible with a most recently stored second checkpoint time of the second clock and for adjusting the first-clock-delta value as a function of the reference cycle rate; and means for indicating a current time value as a sum of the most recently stored second checkpoint cycle count and the first-clock-delta value.

10. A processor arrangement comprising:

a bus;

a real-time clock coupled to the bus; and a processor coupled to the bus and including an internal clock, wherein the internal clock has a first clock rate with precision greater than precision of a second clock rate of the real-time clock and accuracy less than accuracy of the real-time clock, wherein the processor is configured to generate an initial value for a reference cycle rate for the internal clock;

periodically save, according to a checkpoint period, a first checkpoint cycle count that indicates a total of elapsed cycles of the internal clock, wherein the checkpoint period lasts for one or more cycles of the real-time clock;

periodically save a second checkpoint cycle count, concurrent with saving the first checkpoint cycle count, wherein the second checkpoint cycle count indicates a total of elapsed cycles of the real-time clock according to the checkpoint period;

periodically generate an observed cycle rate of the internal clock according to the first period and using the second checkpoint cycle count, a current cycle count of the real-time clock, and the constant value of the second clock rate;

change, in response to an absolute value of a difference between the observed cycle rate and the reference cycle rate being less than a selected first threshold, the reference cycle rate by one-eighth the difference between the observed cycle rate and the reference cycle rate;

calculate a first-clock-delta value as a difference between a current count of elapsed cycles of the internal clock and a most recently stored first checkpoint cycle count of the internal clock;

convert the first-clock-delta value to units compatible with a most recently stored second checkpoint time of the real-time clock and adjust the first-clock-delta value as a function of the reference cycle rate; and indicate a current time value as a sum of the most recently saved second checkpoint cycle count and the first-clock-delta value.

* * * * *